(12) United States Patent
Ando

(10) Patent No.: US 10,801,916 B2
(45) Date of Patent: Oct. 13, 2020

(54) WATER LEAKAGE DETECTION APPARATUS

(71) Applicant: DENSO WAVE INCORPORATED, Chita-gun, Aichi-pref. (JP)

(72) Inventor: Hironobu Ando, Chita-gun (JP)

(73) Assignee: DENSO WAVE INCORPORATED, Aichi. (JP)

( * ) Notice: Subject to any disclaimer, the term of this patent is extended or adjusted under 35 U.S.C. 154(b) by 239 days.

(21) Appl. No.: 15/936,996

(22) Filed: Mar. 27, 2018

(65) Prior Publication Data

US 2019/0003916 A1   Jan. 3, 2019

(30) Foreign Application Priority Data

Jun. 29, 2017   (JP) .................... 2017-127412

(51) Int. Cl.
  *G01M 3/28* (2006.01)
  *G01M 3/40* (2006.01)

(52) U.S. Cl.
  CPC ............ *G01M 3/2815* (2013.01); *G01M 3/40* (2013.01)

(58) Field of Classification Search
  CPC .................................................. G01M 3/2815
  USPC ...................................................... 73/40.5 R
  See application file for complete search history.

(56) References Cited

U.S. PATENT DOCUMENTS

| | | | | |
|---|---|---|---|---|
| 3,665,945 A | * | 5/1972 | Ottenstein ............... | F16K 31/02 137/14 |
| 3,690,150 A | * | 9/1972 | Mullen .................... | F17D 5/02 73/40.5 R |
| 4,043,355 A | * | 8/1977 | Cerruti ................ | G01M 3/2876 137/312 |
| 4,735,231 A | * | 4/1988 | Jacquet ..................... | F17D 5/02 137/459 |
| 5,056,554 A | * | 10/1991 | White ....................... | E03B 7/12 137/312 |
| 5,072,621 A | * | 12/1991 | Hasselmann ....... | G01M 3/2892 73/40.5 R |
| 5,283,552 A | * | 2/1994 | Sol ...................... | G01M 3/2815 340/605 |
| 5,540,083 A | * | 7/1996 | Sato ..................... | G01M 3/2876 73/40 |
| 5,557,965 A | * | 9/1996 | Fiechtner .............. | G01M 3/007 73/40.5 R |
| 5,739,421 A | * | 4/1998 | Iochi .................. | F02M 25/0809 73/49.7 |
| 5,850,037 A | * | 12/1998 | Mullins ............... | G01M 3/2815 73/40.5 R |
| 6,216,727 B1 | | 4/2001 | Genova et al. | |

(Continued)

FOREIGN PATENT DOCUMENTS

JP      2018-184798 A   *  11/2018

*Primary Examiner* — John Fitzgerald

(74) *Attorney, Agent, or Firm* — Oliff PLC

(57) ABSTRACT

A water leakage detection apparatus includes a pressure sensor, a detecting unit, and an actuator. The pressure sensor is disposed in a water pipe. The detecting unit detects water leakage based on sensor signals from the pressure sensor. The actuator is controlled by the detecting unit, and opens and closes an electromagnetic valve that is disposed in the water pipe. The detecting unit samples the sensor signals in a state in which the water pipe is closed by the electromagnetic valve, and performs a water leakage determination for detecting water leakage based on the sampled sensor signals.

10 Claims, 14 Drawing Sheets

(56) References Cited

U.S. PATENT DOCUMENTS

| | | | | |
|---|---|---|---|---|
| 6,543,479 B2* | 4/2003 | Coffey | E03B 7/071 | 137/624.11 |
| 7,174,771 B2* | 2/2007 | Cooper | G01M 3/2815 | 73/40.5 R |
| 7,228,726 B2* | 6/2007 | Kates | G01M 3/2807 | 340/632 |
| 7,306,008 B2* | 12/2007 | Tornay | F17D 5/06 | 137/460 |
| 7,574,896 B1* | 8/2009 | Cooper | G01M 3/2815 | 73/40.5 R |
| 7,900,647 B2* | 3/2011 | Tornay | F17D 5/06 | 137/15.11 |
| 8,561,636 B2* | 10/2013 | Eithun | F17D 5/02 | 137/487.5 |
| 9,395,262 B1* | 7/2016 | Kumar | G01M 3/2807 | |
| 9,558,453 B1* | 1/2017 | Chaudhary | G06N 7/005 | |
| 9,599,499 B1* | 3/2017 | Chaudhary | G01F 22/02 | |
| 9,599,531 B1* | 3/2017 | Chaudhary | F17D 3/01 | |
| 10,354,195 B2* | 7/2019 | Chaudhary | G06N 7/005 | |
| 10,359,336 B2* | 7/2019 | Bagasra | B64C 39/024 | |
| 2002/0148515 A1* | 10/2002 | Coffey | E03B 7/071 | 137/624.11 |
| 2003/0056573 A1* | 3/2003 | Miwa | F02M 25/0809 | 73/40.5 R |
| 2005/0011252 A1* | 1/2005 | Arima | G01M 3/2815 | 73/40.5 R |
| 2005/0072214 A1* | 4/2005 | Cooper | G01M 3/2815 | 73/40.5 R |
| 2005/0224118 A1* | 10/2005 | Tornay | F17D 5/06 | 137/624.11 |
| 2006/0260691 A1* | 11/2006 | Davidoff | G01M 3/2807 | 137/487.5 |
| 2008/0066812 A1* | 3/2008 | Tornay | F17D 5/06 | 137/624.11 |
| 2008/0092632 A1* | 4/2008 | Hoffmann | G01M 3/2876 | 73/40.5 A |
| 2008/0266125 A1* | 10/2008 | Windisch | E03B 7/071 | 340/605 |
| 2008/0302172 A1* | 12/2008 | Kates | G01M 3/2807 | 73/40.5 R |
| 2009/0223285 A1* | 9/2009 | Windisch | G01M 3/2815 | 73/40.5 R |
| 2010/0175461 A1* | 7/2010 | Brown | G01M 3/2807 | 73/40.5 R |
| 2010/0212748 A1* | 8/2010 | Davidoff | F17D 5/02 | 137/10 |
| 2011/0010115 A1* | 1/2011 | Bosshart | G01M 3/002 | 702/51 |
| 2011/0146805 A1* | 6/2011 | Foster | E03B 7/071 | 137/2 |
| 2015/0346049 A1* | 12/2015 | Schwind | G01M 3/2815 | 73/40.7 |
| 2017/0003200 A1* | 1/2017 | McDowell | F17D 5/06 | |
| 2017/0010176 A1* | 1/2017 | Inoue | F02C 6/18 | |
| 2017/0023434 A1* | 1/2017 | Jerez | E03B 7/003 | |
| 2017/0176957 A1* | 6/2017 | Chaudhary | E03B 7/071 | |
| 2017/0177008 A1* | 6/2017 | Chaudhary | G01M 3/2807 | |
| 2017/0178016 A1* | 6/2017 | Chaudhary | G06N 7/005 | |
| 2017/0322105 A1* | 11/2017 | Guixeras Nogue | G01M 3/2807 | |
| 2018/0127957 A1* | 5/2018 | Enev | G01M 3/2815 | |
| 2018/0164179 A1* | 6/2018 | Bagasra | B64D 1/18 | |
| 2018/0266711 A1* | 9/2018 | Karamanos | G01N 3/12 | |
| 2018/0328811 A1* | 11/2018 | Mielke | G01M 3/2815 | |
| 2018/0348081 A1* | 12/2018 | Levine | G01M 3/04 | |
| 2019/0063689 A1* | 2/2019 | Liu | G01M 3/2815 | |
| 2020/0025643 A1* | 1/2020 | Yokoi | G01M 3/26 | |

\* cited by examiner

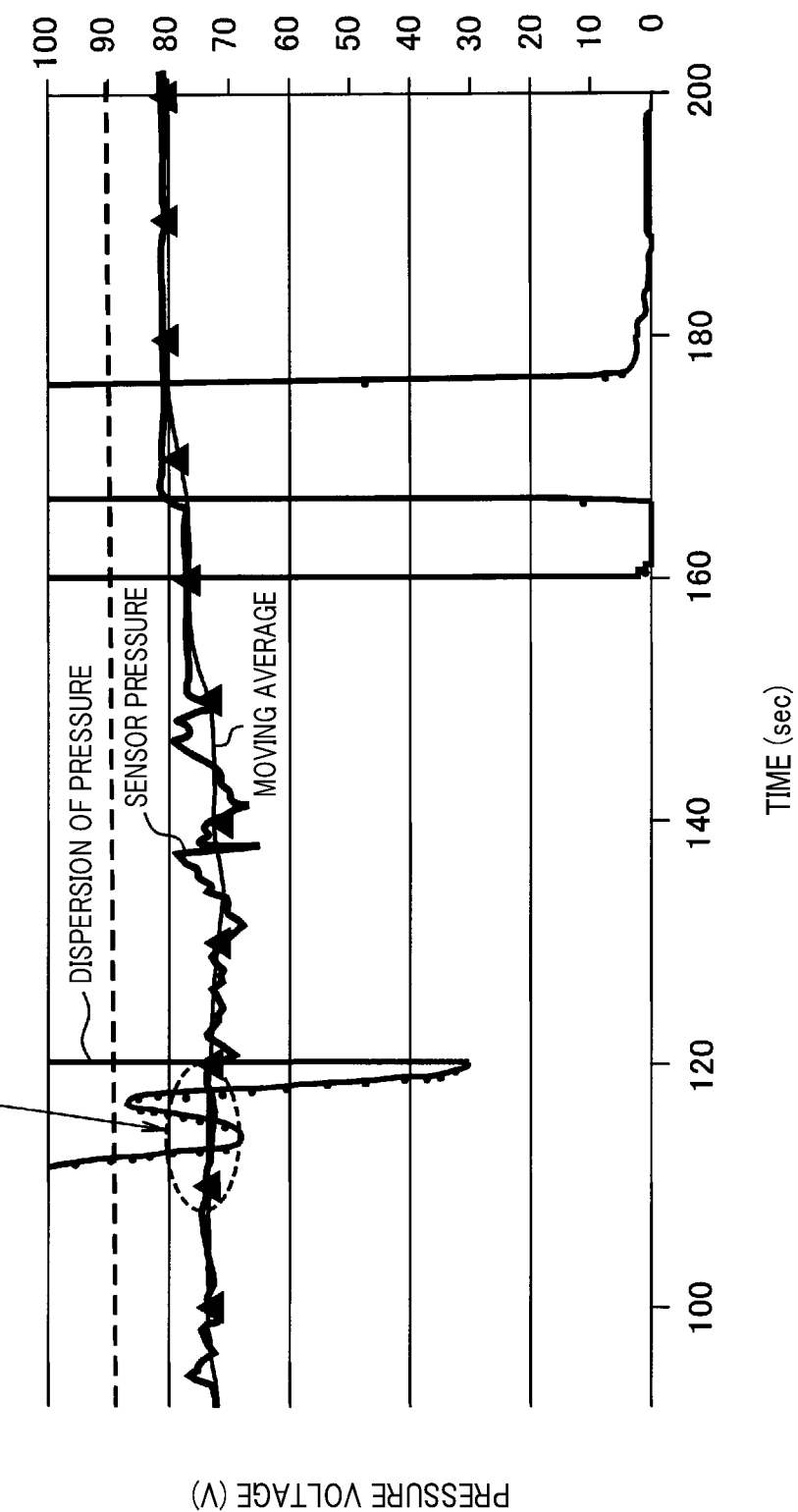

FIG.13

| CASE | WHEN AMOUNT OF WATER USAGE IS SMALL, VARIATION IN SUPPLY PRESSURE OCCURS AND PRESSURE TEMPORARILY EXCEEDS PRESSURE BEFORE START OF WATER USAGE | AMOUNT OF WATER USAGE IS LARGE AND PRESSURE VARIATION IS SMALL | WATER USAGE HAS ENDED, BUT PRESSURE DOES NOT RETURN TO PRESSURE BEFORE START OF WATER USAGE | PRESSURE RETURNS TO PRESSURE BEFORE START OF WATER USAGE DUE TO END OF WATER USAGE | PRESSURE VARIATION IS SMALL FOR RELATIVELY LONG AMOUNT OF TIME WHILE WATER IS IN USE |
|---|---|---|---|---|---|
| 1) DETERMINATION | TRUE | FALSE | TRUE | TRUE | FALSE |
| 2) DETERMINATION | FALSE | TRUE | TRUE | TRUE | FALSE |

1) (MOVING AVERAGE VALUE) − (PRESSURE BEFORE START OF USAGE) ≥ (FIRST THRESHOLD)
2) DISPERSION OF PRESSURE IS LESS THAN FIXED VALUE

WATER LEAKAGE DETECTION APPARATUS

CROSS-REFERENCE TO RELATED APPLICATION

This application is based on and claims the benefit of priority from earlier Japanese Patent Application No. 2017-127412, filed Jun. 29, 2017, the description of which is incorporated herein by reference.

BACKGROUND

Technical Field

The present disclosure relates to an apparatus that detects water leakage in a water pipe.

Related Art

For example, U.S. Pat. No. 6,216,727 discloses a configuration for detecting minute water leakage of 10 ml/min or less that occurs in the water supply of a typical home or the like. In the configuration, bypass plumbing for water leakage detection is provided separately from a main plumbing. A sensor is disposed in the bypass plumbing. In addition, a check valve or the like for flowrate adjustment is used in the main plumbing so that an amount of water flowing into the bypass plumbing is appropriately set.

On the whole, the configuration in U.S. Pat. No. 6,216,727 is complex. A precise sensor that is capable of detecting a minute flowrate is required. Therefore, the apparatus becomes expensive in total. In addition, pressure loss occurs as a result of the bypass plumbing being provided and the check valve for sending an appropriate amount of water to the bypass plumbing being provided. Therefore, insufficient water pressure also becomes a concern. In addition to the foregoing, a following system is also known. That is, in the system, a sensor that is capable of directly detecting moisture using electrodes or the like is disposed in a location where water leakage is likely to occur. When water leakage is detected, a valve in a water pipe is closed through communication or the like. However, in this system, water leakage cannot be detected unless the water leakage occurs in the location in which the sensor is disposed.

It is thus desired to provide a water leakage detection apparatus that is capable of reliably detecting minute water leakage without the use of a precise flowrate sensor.

SUMMARY

An exemplary embodiment of the present disclosure provides a water leakage detection apparatus including: a pressure sensor that is disposed in a water pipe; a detecting unit that detects water leakage based on sensor signals from the pressure sensor; and an actuator that is controlled by the detecting unit, and opens and closes an electromagnetic valve that is disposed in the water pipe, the detecting unit sampling the sensor signals in a state in which the water pipe is closed by the electromagnetic valve and performing a water leakage determination for detecting water leakage based on the sampled sensor signals.

In the water leakage detection apparatus according to the exemplary embodiment, the detecting unit samples sensor signals outputted by a pressure sensor, in a state in which a water pipe is closed by an electromagnetic valve, and detects water leakage based on the sampled sensor signals. That is, as a result of the water pipe being closed by the electromagnetic valve, even if a minute water leak occurs, the minute water leak appears as a phenomenon in which pressure on a downstream side of the location of the water pipe that is closed decreases. Therefore, as a result of the water leakage detection apparatus according to the exemplary embodiment, a minute water leakage can be detected without the need for the water pipe to have a special structure and without use of a precise flowrate sensor.

In the water leakage detection apparatus according to the exemplary embodiment, the detecting unit may successively accumulate differential values of the sampled sensor signals and determine a cumulative value. The detecting unit may then perform a water leakage determination for detecting water leakage when the cumulative value exceeds a determination value upon elapse of a predetermined determination time. In cases in which a minute water leakage occurs, time is required until the pressure inside the water pipe on the downstream side of the electromagnetic valve decreases to a certain extent from when the water pipe is closed. Therefore, when a minute water leakage is to be detected through evaluation of an immediate value of the pressure indicated by the sensor signals, time is required until the determination is made.

Therefore, the detecting unit of the exemplary embodiment may successively accumulate differential values of the sensor signals. The detecting unit may then compare the cumulative value upon elapse of the determination time to the determination value, and thereby detect water leakage. In a state in which water leakage has not occurred, pressure does not vary. Even if the pressure varies, minute increases and decreases sporadically occur. Therefore, the cumulative results in the differential values of the sensor signals are cancelled out. In cases in which a minute water leakage has occurred, the differential values of the sensor signals indicate only a direction of decrease in pressure. The decrease in pressure indicated by the sensor signals gradually progresses. However, the value obtained through accumulation of the differential values of the sensor signals indicates a larger change. Therefore, compared to cases in which the pressure indicated by the sensor signals is evaluated based on the immediate value, a minute water leakage can be detected in a short amount of time.

In the water leakage detection apparatus according to the exemplary embodiment, the detecting unit may set either of the determination time and the determination value, or both, based on an amount of water inside a plumbing on the downstream side of the position at which the electromagnetic valve is disposed. That is, the rate at which the pressure inside the plumbing decreases is proportional to the speed at which water leaks from the plumbing and the length of the plumbing, that is, the volume of the water inside the plumbing. Therefore, as a result of either of the determination time and the determination value, or both, being set based on the plumbing system in which the water leakage detection apparatus is disposed, the determination can be accurately performed. In addition, the determination time can be optimized and the water leakage determination can be efficiently performed.

Specifically, for example, in the water leakage detection apparatus according to the exemplary embodiment, the detecting unit may set either of a longer determination time and a lower determination value, or both, as the amount of water in the plumbing increases. As a result, under a circumstance in which the amount of water in the plumbing is relatively small and the amount of water usage is not fixed, such as in a typical home, the water leakage detection can be completed in a short amount of time and the amount of time during which water cannot be used can be minimized. In addition, under a circumstance in which the amount of water in the plumbing is large but the period over which water is not in use is determined, such as in a factory, time can be taken for water leakage determination and erroneous determination can be reduced.

In the water leakage detection apparatus according to the exemplary embodiment, the detecting unit may set either of the determination time and the determination value, or both, based on decrease in pressure when a fixed amount of water is discharged in a state in which the electromagnetic valve is closed, when set to threshold determination mode during set-up. As a result, either of the determination time and the determination value, or both, can be determined based on the actual amount of water in the water pipe in which the water leakage detection apparatus is set.

In the water leakage detection apparatus according to the exemplary embodiment, the detecting unit may store past water usage patterns. The detecting unit may perform the water leakage determination during a time period in which water is highly likely to not be in use. As a result, the water leakage determination being performed during a time at which the user uses water can be prevented.

In the water leakage detection apparatus according to the exemplary embodiment, the detecting unit may determine whether or not water is in use before performing the water leakage determination. The detecting unit may optionally not perform the water leakage determination when determined that water is in use, and may perform the water leakage determination when determined that water usage has ended. As a result, the water leakage determination can be performed such as to avoid a time period during which the user is using water.

BRIEF DESCRIPTION OF THE DRAWINGS

In the accompanying drawings:

FIG. 12 is an enlarged view of a section of FIG. 11;

FIG. 13 is a diagram of true and false conditions regarding determinations of conditions 1) and 2) based on a state of water usage;

DESCRIPTION OF THE EMBODIMENTS

An embodiment will hereinafter be described with reference to the drawings.

Figure 4:
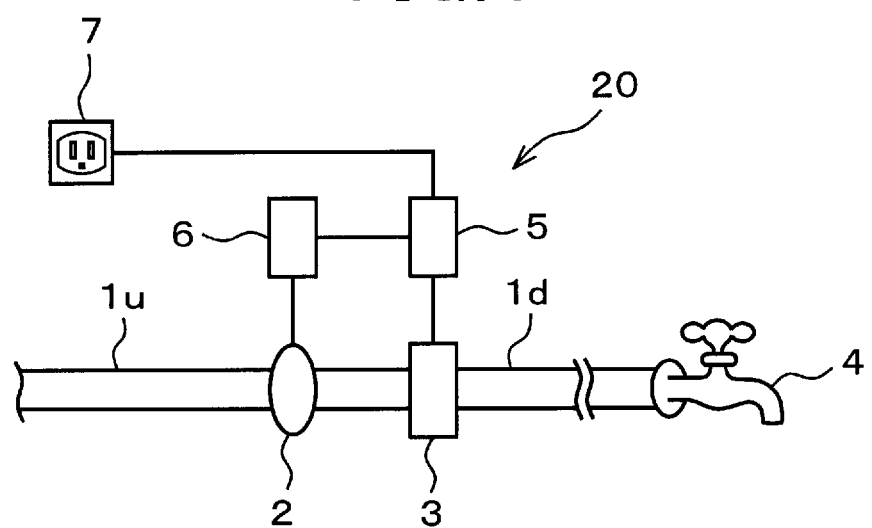
FIG. 4 is a functional block diagram of a configuration of a water leakage detection system.

FIG. 4 is a functional block diagram of a configuration of a water leakage detection system. For example, a water pipe 1 is that which is installed to supply water to a typical home. An electromagnetic valve 2 and a pressure sensor 3 are disposed in a midway portion of the water pipe 1. Here, a portion of the water pipe 1 that is on an upstream side of the electromagnetic valve 2, that is, a portion on a water-source side is referred to as a water pipe 1*u*. A portion of the water pipe 1 that is on a downstream side of the electromagnetic valve 2, that is, a portion on a home side is referred to as a water pipe 1*d*. A faucet 4 is disposed at the end of the water pipe 1*d*.

The pressure sensor 3 outputs a sensor signal as a voltage signal that is based on water pressure inside the water pipe 1*d*. The sensor signal is inputted to a controller 5. For example, the controller 5 controls opening and closing of the electromagnetic valve 2 by a valve control actuator 6 that is a motor or the like. The electromagnetic valve 2 fully opens or fully closes the water pipe 1. The controller 5 is supplied power from a commercial alternating-current power supply 7. A power supply circuit (not shown) provided inside the controller 5 generates direct-current power for operations. The generated power is also supplied to the actuator 6. Power may also be supplied by a battery.

Figure 5:
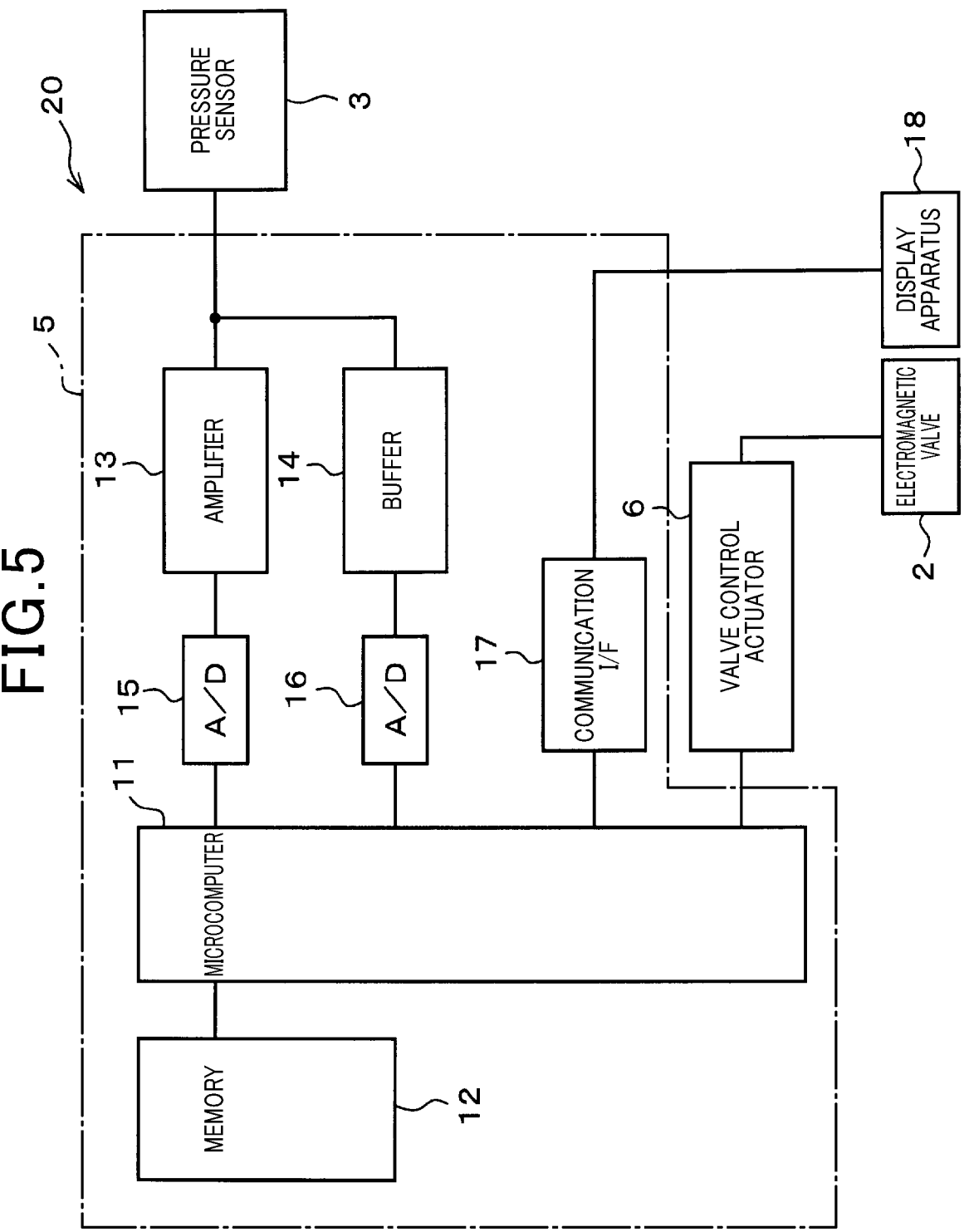
FIG. 5 is a functional block diagram mainly showing an internal configuration of a controller.

FIG. 5 is a functional block diagram mainly showing an internal configuration of the controller 5. The controller 5 is mainly configured by a microcomputer 11. The microcomputer 11 performs various types of control based on a control program and data stored in a memory 12. The sensor signal from the pressure sensor 3 is inputted to analog-to-digital (A/D) converters 15 and 16 via an amplifier 13 and a buffer 14, respectively. The A/D converters 15 and 16 perform an AD conversion on the sensor signal and input the converted signals to the microcomputer 11.

Here, a signal path that passes through the amplifier 13 is used for amplifying the voltage signal for detection of minute water leakage. Meanwhile, a signal path that passes through the buffer 14 is used when a change in water pressure is relatively large, such as when a start of water usage is detected. The A/D converters 15 and 16 may be configured by a single A/D converter of which an input channel is switched between a voltage inputted via the amplifier 13 and a voltage inputted via the buffer 14. In addition, the A/D converter may be provided inside the microcomputer 11.

The microcomputer 11 communicates with a display apparatus 18 via a communication interface 17. For example, the display apparatus 18 is set in a wall surface of a house. The display apparatus 18 displays information on the state of the water pipe 1 and the like that has been ascertained by the controller 5, using symbols, character messages, and the like. The communication interface 17 shown in FIG. 5 is for wired communication. However, the communication interface 17 may also be a wireless communication interface, such as Wi-Fi (registered trademark). In addition, the display apparatus 18 may be a smartphone or the like that is carried by a user. The controller 5 corresponds to a detecting unit and a determining unit. In the above-described configuration, the pressure sensor 3, the controller 5, and the display apparatus 18 configure the water leakage detection apparatus 20.

Next, workings according to the present embodiment will be described with reference to FIGS. 1 to 3 and 4 to 16. The controller 5 performs a water leakage detection process shown in FIG. 1, a water usage end determination process shown in FIG. 2, and a water usage start determination process shown in FIG. 3.

<Water Leakage Detection Process>

First, the controller 5 performs a water usage determination (step S1). The water usage determination is the above-described water usage start determination process. When determined that water is in use (YES at step S2), the controller 5 performs a water usage time determination (step S13). The water usage time determination is a process that is performed to determine an amount of time over which water is continuously used. For example, an upper-limit time of the water usage time is set by the user based on an actual state of a water supply system to which the water leakage detection apparatus 20 is applied. When determined that the continuous water usage time exceeds the upper-limit time (NO at step S14), the controller 5 determines that water leakage has occurred and notifies the user of the water leakage through the display apparatus 18 (step S12).

Meanwhile, when determined that water is not in use (NO at step S2), the controller 5 performs a water usage scheduling time determination (step S3). Here, the controller 5 has stored therein past water usage patterns. The controller 5 determines whether or not a current time falls within a time period during which the user is expected to use water. Then, when determined that the current time does not fall within this time period (NO at step S4), the controller 5 closes the electromagnetic valve 2, described as a shutoff valve in FIG. 1 (step S5). In addition, when determined that the current time falls within the time period (YES at step S4), the controller 5 returns to step S1.

When the electromagnetic valve 2 is fully closed (NO at step S6), the controller 5 performs the A/D conversion on the sensor signal from the pressure sensor 3 and reads the converted sensor signal. The controller 5 reads, that is, samples the sensor signals at a 0.2-second interval. Then, the controller 5 determines differential values of the sensor signals that have been read at the 0.2-second interval. The controller 5 successively accumulates and adds the differential values, and thereby determines a sum of differential values (step S8). The controller 5 repeatedly performs steps S7 and S8 until elapse of a determination period (NO at step S9).

Figure 6:
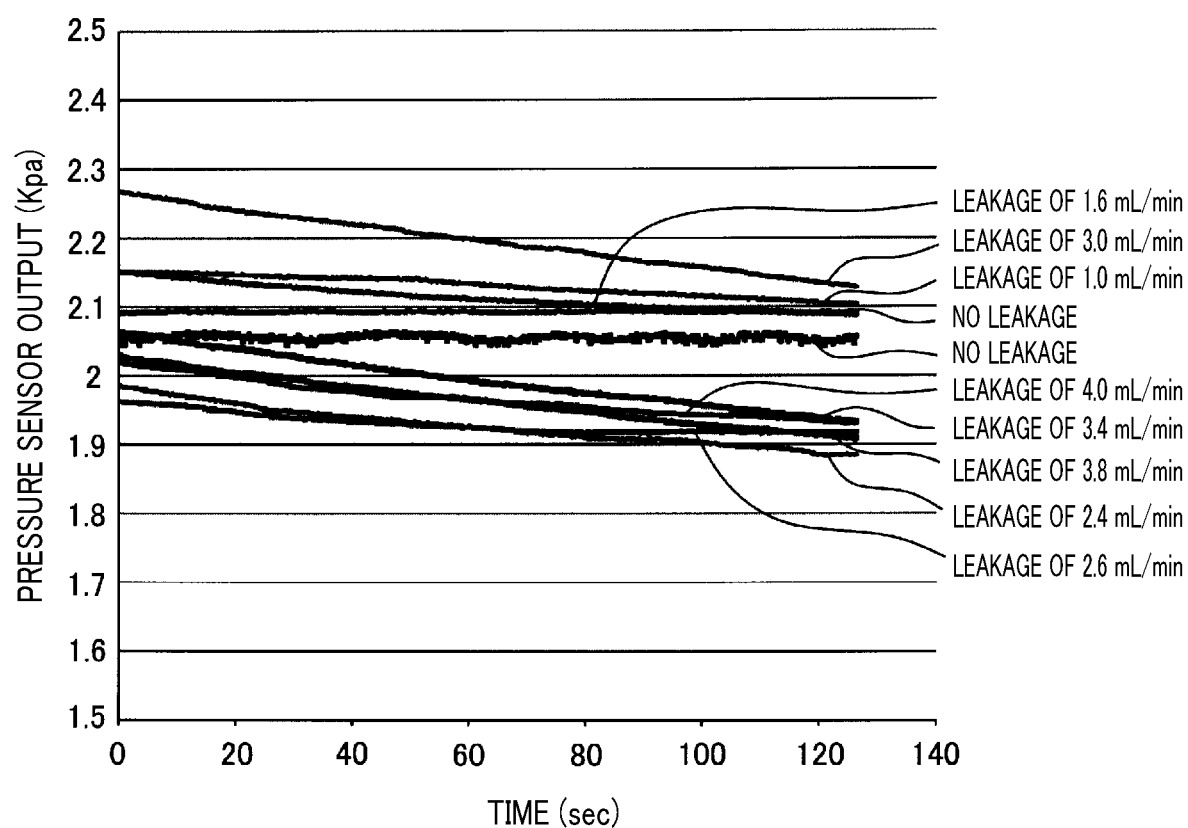
FIG. 6 is a diagram of changes in pressure detected by a pressure sensor based on an occurrence state of water leakage.

Here, FIG. 6 shows the changes in pressure indicated by the sensor signals of the pressure sensor 3 accompanying the elapse of time, in each of the following cases, that is, when water leakage has not occurred and when water leakages of 1.0 ml/min to 4.0 ml/min have occurred. An initial value of the pressure differs depending on the circumstances under which each measurement has been performed. In addition, even in cases in which water leakage has not occurred, the pressure is substantially fixed in some cases and minutely varies in other cases.

The water leakage herein is that of a minute amount of 4.0 ml/min or less. Therefore, the extent by which the pressure decreases is very relaxed. For example, when water leakage of 3.0 ml/min has occurred, the decrease in pressure from the initial value upon elapse of 120 seconds is about 30 Kpa. The supply pressure in the water pipe is likely to vary at all times. Therefore, when water leakage occurs, the pressure does not necessarily monotonically decrease as shown in FIG. 6. Therefore, if the decrease in pressure corresponding to water leakage is determined based on an immediate value of the pressure, it becomes necessary to wait until the pressure value sufficiently decreases. Time is required for the determination. For example, five to ten minutes are required.

Figure 8:
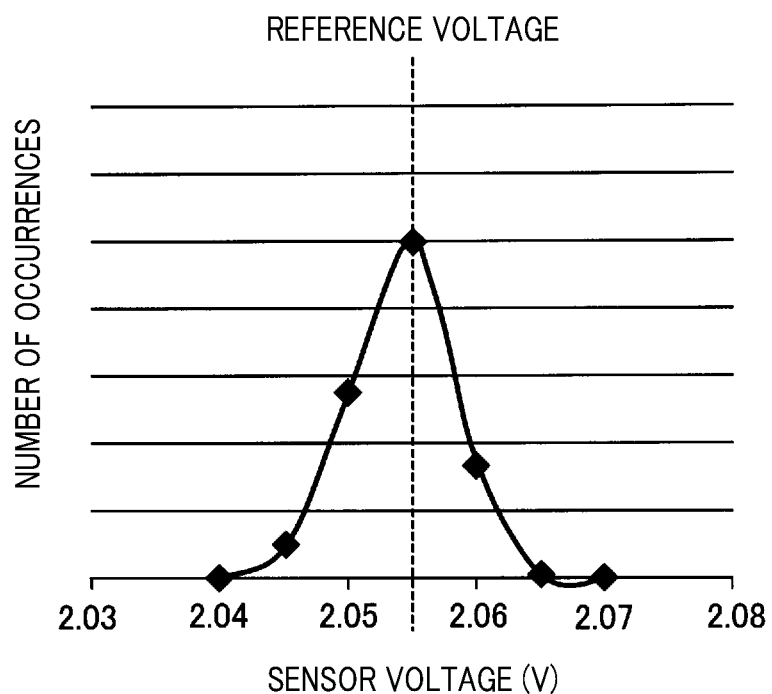
FIG. 8 is a diagram of voltage values outputted by the pressure sensor when water leakage has not occurred.
Figure 9:
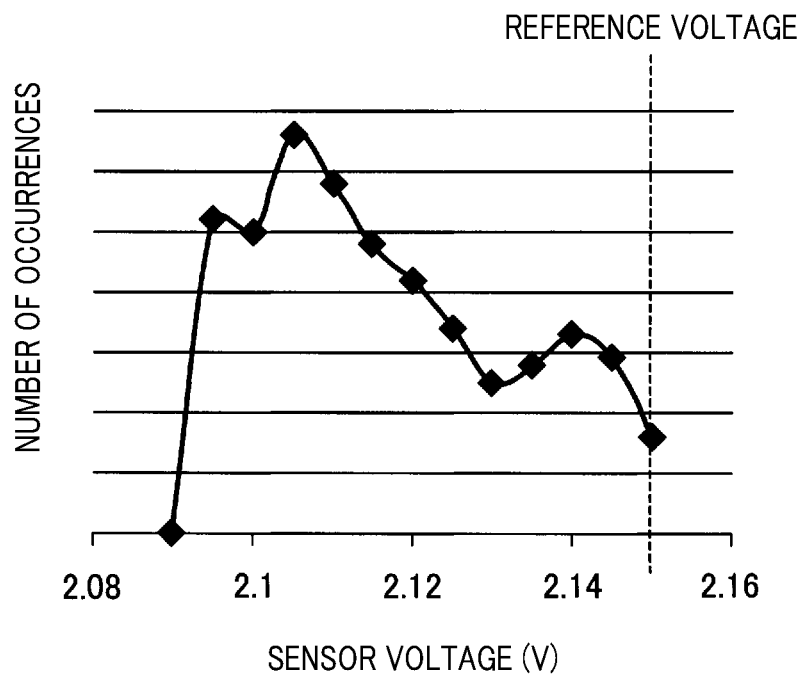
FIG. 9 is a diagram of voltage values outputted by the pressure sensor when water leakage has occurred.

As shown in FIG. 8, the voltage of the signal outputted from the pressure sensor 3 when water leakage has not occurred is mainly about 2.055 V, for example, and has very little variation. Meanwhile, as shown in FIG. 9, when water leakage has occurred, the voltage of the signal outputted from the pressure sensor 3 significantly varies and fluctuates over a range of about 0.06 V.

Figure 7:
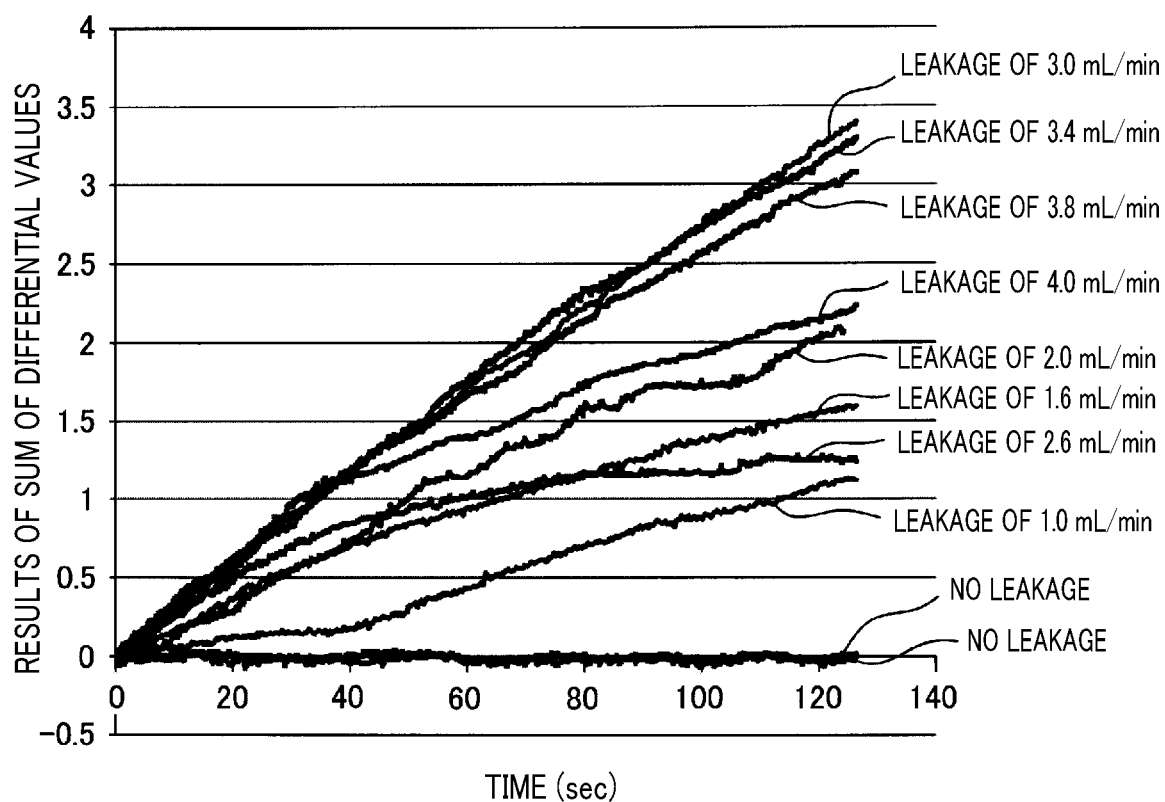
FIG. 7 is a diagram of changes in a sum of differential values of pressure based on the changes in pressure shown in FIG. 6.

In this regard, when the sum of differential values obtained through accumulation of the differential values of the pressure value is determined, as shown in FIG. 7, a trend of the changes caused by the occurrence of water leakage becomes more noticeable. The sum of differential values when water leakage has not occurred is about zero, as expected. However, even when the amount of water leakage is 1.0 ml/min, which is the minimum amount, the sum of differential values upon elapse of about 20 to 30 seconds reaches about 0.2. A significant difference can be seen. Therefore, if the sum of differential values of pressure is evaluated, even a minute water leakage can be detected in a short amount of time.

Figure 1:
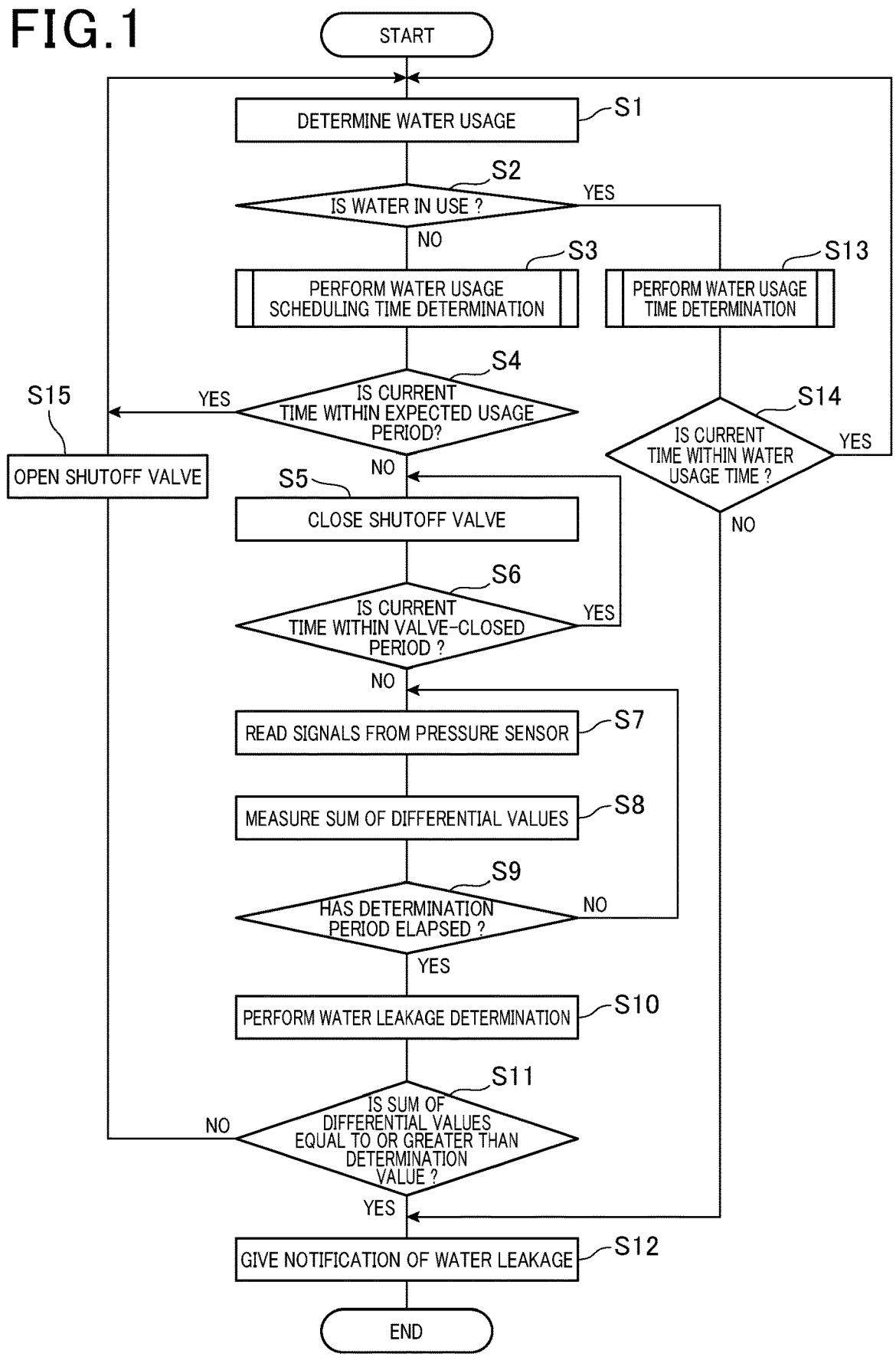
FIG. 1 is a flowchart of a water leakage detection process according to an embodiment.

Returning to the description with reference to FIG. 1, for example, when determined that the determination period has been reached (YES at step S9), the controller 5 performs a water leakage determination (step S10). For example, the determination period is set to an amount of time over which about 50 signal samples are acquired. The controller 5 performs the water leakage determination by comparing the sum of differential values determined at step S8 to a determination value. When determined that the sum of differential values is less than the determination value (NO at step S11), the controller 5 determines that water leakage has not occurred. The controller 5 opens the electromagnetic valve 2 (step S15) and returns to step S1. Meanwhile, when determined that the sum of differential values is equal to or greater than the determination value (YES at step S11), the controller 5 determines that water leakage has occurred and proceeds to step S12.

Here, a rate at which the pressure in the water pipe decreases is dependent on a speed at which water leaks from the water pipe and a length of the plumbing, that is a volume of the water in the plumbing. Therefore, if the threshold for determining whether or not water leakage has occurred is adjusted based on the plumbing system in which the water leakage detection apparatus 20 is set, the determination can be accurately performed. When the amount of water in the plumbing is large, the determination time is extended. Alternatively, the determination value is decreased. Still alternatively, both the determination is extended and the determination value is decreased. As a result, for example, under a circumstance in which the amount of water inside the water pipe 1d is relatively small and the amount of water usage is not fixed, such as in a typical home, the water leakage determination can be completed in a short amount of time and the amount of time during which water cannot be used can be minimized. In addition, for example, under a circumstance in which the amount of water in the water pipe is large but the period over which water is not in use is determined, such as in a factory, time can be taken for water leakage determination and erroneous determination can be reduced.

Furthermore, either of the determination time and the determination value, or both, can be determined in the following manner. That is, when the water leakage detection apparatus 20 is initially set up, the controller 5 is set to threshold determination mode. Then, in a state in which the electromagnetic valve 2 is closed, a fixed amount of water is discharged on the downstream side of the electromagnetic valve 2. Either of the determination time and the determination value, or both, is determined based on the decrease in pressure at this time. In this way, either of the determination time and the determination value, or both, can be determined based on the actual amount of water in the water pipe in which the water leakage detection apparatus 20 is set.

<Water Usage End Determination Process>

Next, the water usage end determination process will be described. First, the principle behind the water usage end determination will be described with reference to FIGS. 10 to 13.

Figure 10:
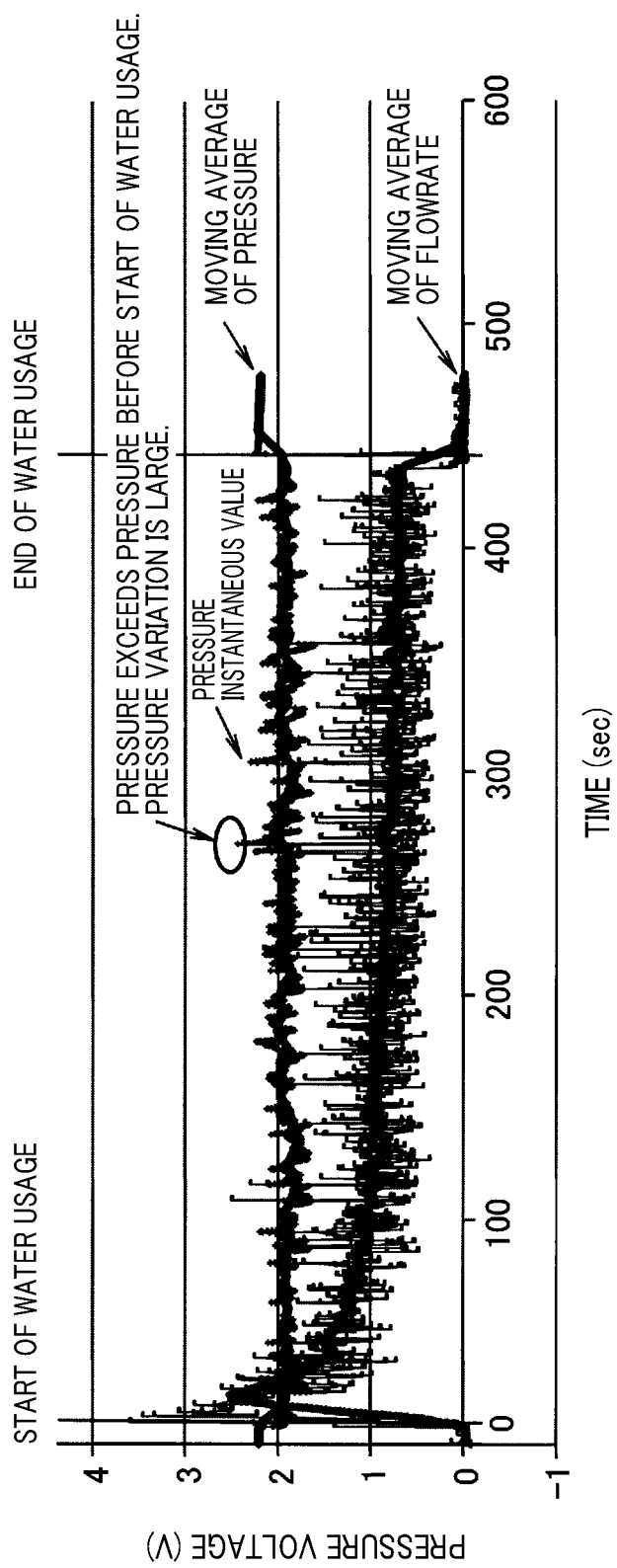
FIG. 10 is a diagram of changes in pressure after a start of water usage and amount of water inside a water pipe when an amount of water usage is small.

FIG. 10 shows the changes in the pressure and the amount of water inside the water pipe when the amount of water usage is small. In addition, FIG. 10 indicates moving average values of both the pressure and the amount of water by thick solid lines. In this case, the decrease in water pressure is small. Therefore, the changes in pressure detected by the pressure sensor 3 accompanying variations in supply pressure are relatively large. Thus, an instantaneous value of the pressure may exceed the pressure before the start of water usage. Consequently, if dispersion of pressure is evaluated, the value thereof is large.

Figure 11:
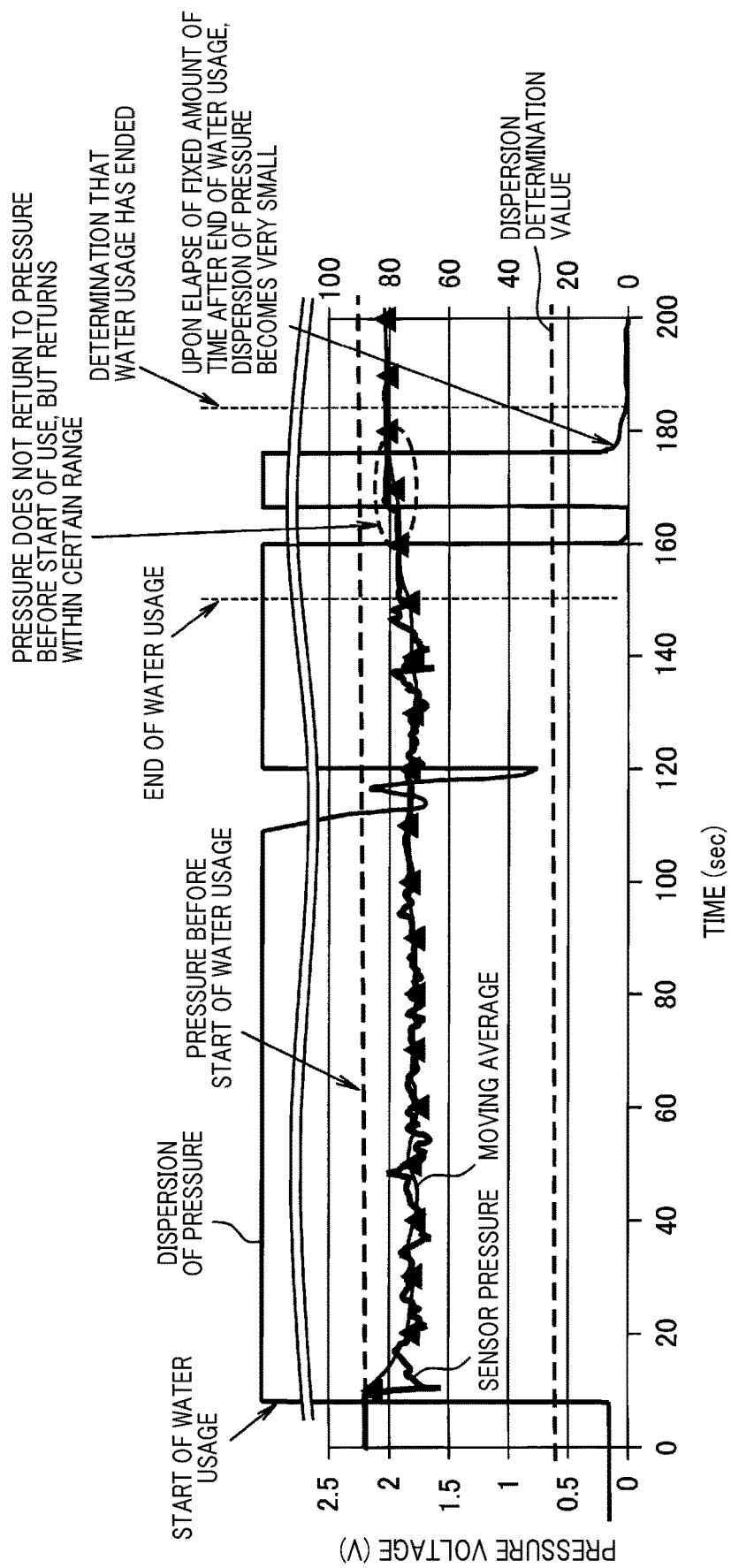
FIG. 11 is a diagram of the changes in pressure shown in FIG. 10 up to 200 seconds after the start of water usage and a dispersion of pressure.

FIG. 11 shows the changes in pressure shown in FIG. 10 up to 200 seconds after the start of water usage. FIG. 11 also shows the dispersion of pressure. When water usage ends, the pressure may not return to the value before the start of water usage indicated by a broken line in FIG. 11. However, the pressure does return to fall within a certain range with reference to the value before the start of water usage. In addition, the variation in pressure is extremely small. That is, when the moving average value of pressure is determined, the difference between the moving average value and the pressure before the start of water usage is within a certain range and the dispersion of pressure is small.

Meanwhile, when the amount of water usage is large, the difference in pressure from that before the start of water usage is large. However, the variation in pressure is relatively small. That is, the difference between the moving average value of pressure and the pressure before the start of water usage is greater than that when water usage has ended.

In addition, when water is in use, as well, the variation in pressure may become small for a relatively long amount of time. However, small variations do occur. As shown in FIG. 12, when the variation is evaluated through dispersion, the dispersion becomes greater than that when water usage has ended.

From the trends based on the above-described states:

1) the difference between the moving average value of pressure and the pressure before the start of water usage is evaluated. Because the pressure decreases due to the start of water usage, the above-described difference indicates a negative value. Here, a first threshold for the negative value is set. If the following is established, the moving average value falls within a certain range with reference to the pressure before the start of usage:

(moving average value)−(pressure before start of usage)≥(first threshold)

In addition, 2) the dispersion of pressure is less than a fixed value.

When these two conditions 1) and 2) are met over a fixed amount of time, a determination that water usage has ended can be made. Therefore, as a result of the moving average value and the dispersion being evaluated for the signals outputted from the pressure sensor 3, the point at which water usage has ended can be reliability determined. FIG. 13 shows the manner in which the determinations of the conditions 1) and 2) described above are true or false in each case.

Figure 2:
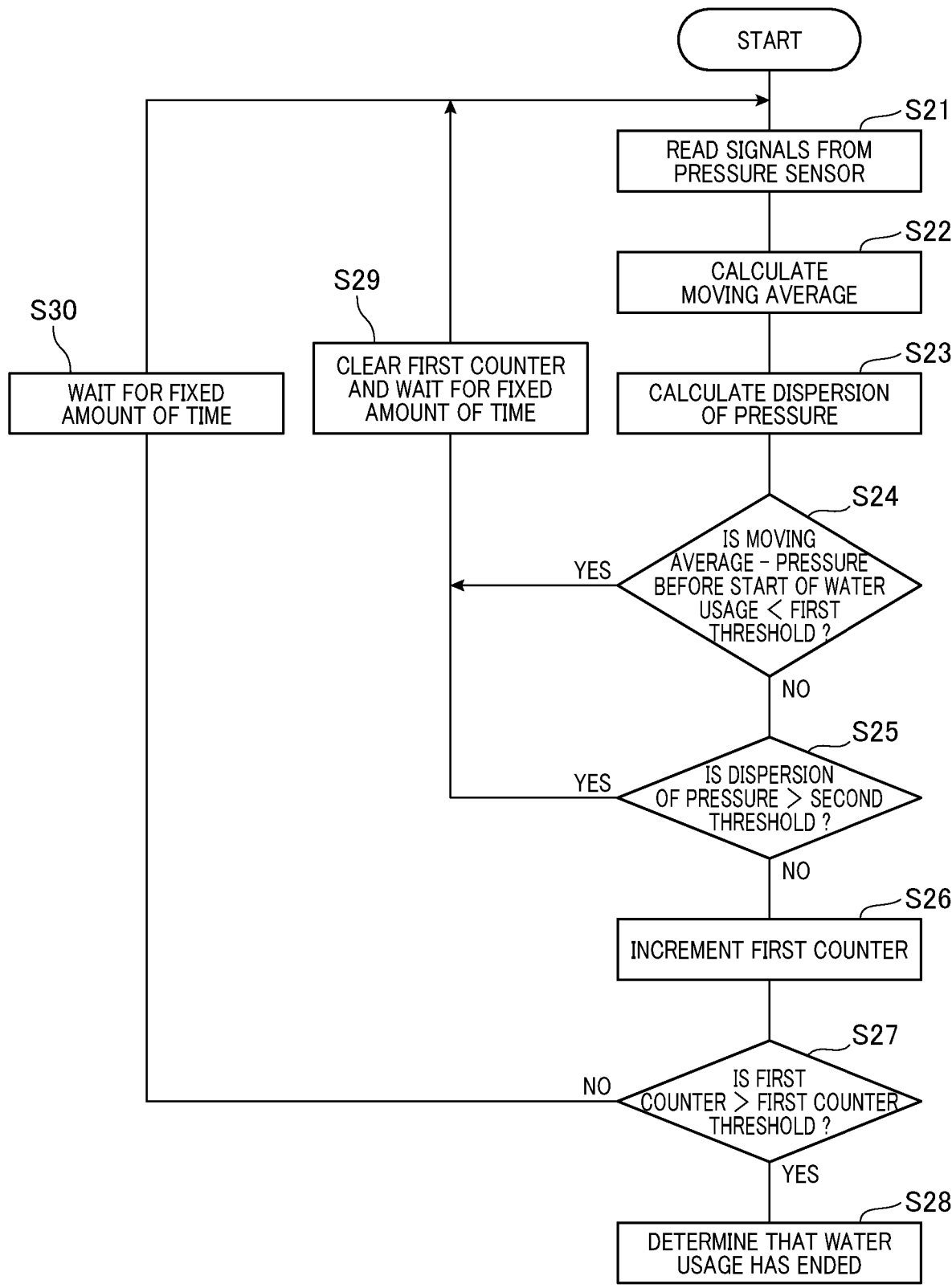
FIG. 2 is a flowchart of a water usage end determination process.

Next, the water usage end determination process will be described with reference to FIG. 2. First, the controller 5 reads the sensor signals of the pressure sensor 3 (step S21) and calculates the moving average value (step S22). The controller 5 then calculates a dispersion value of pressure (step S23). Then, the controller 5 compares the difference obtained by subtracting the pressure before the start of water usage from the moving average value to the first threshold (step S24). Identification of the pressure before the start of water usage will be described in the description of the water usage start determination process, described hereafter. When determined that the difference is less than the first threshold (YES), the controller 5 determines that water is in use. The controller 5 clears a first counter for end determination. The controller 5 waits for a fixed period, that is, for example, 0.2 seconds that is the sampling interval (step S29) and returns to step S21.

Meanwhile, when determined that the difference exceeds the first threshold (NO), the controller 5 compares the dispersion of pressure to a second threshold (step S25). When determined that the dispersion exceeds the second threshold (YES), the controller 5 determines that water is in use and proceeds to step S29. When determined that the dispersion has become equal to or less than the second threshold (NO), both of the conditions 1) and 2) become true. However, the controller 5 increments the first counter for end determination to prevent erroneous determination (step S26). Then, the controller 5 compares the count value of the first counter to a first counter threshold (step S27). When determined that the count value is equal to or less than the first counter threshold (NO), the controller 5 waits for a fixed period (step S30) and then returns to step S21. Meanwhile, when determined that the count value exceeds the first counter threshold (YES), the controller 5 determines that water usage has ended (step S28).

<Water Usage Start Determination Process>

Next, the water usage start determination process will be described. First, the principle behind the water usage start determination will be described with reference to FIGS. 14 and 15.

Figure 14:
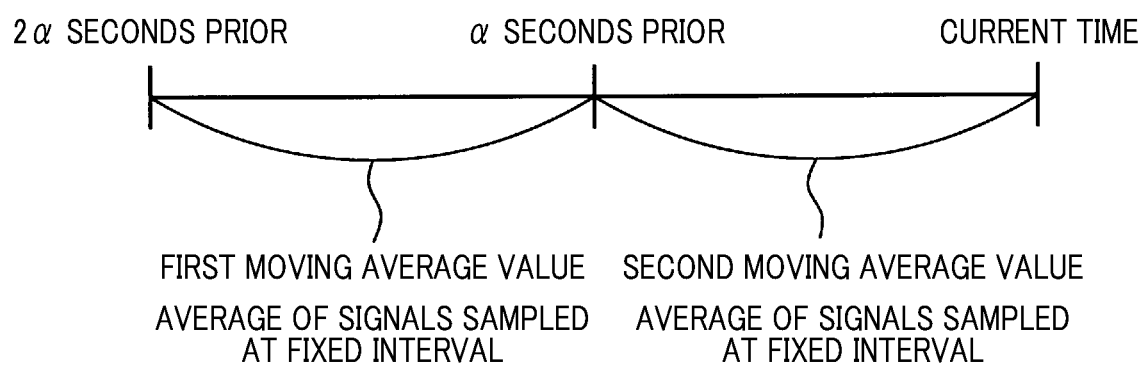
FIG. 14 is a diagram of a relationship between a first moving average value and a second moving average value determined with a current time serving as a starting point.

In a state in which water is not in use, although pressure change does occur in the pipe based on variations in supply pressure, the change is small and the dispersion of pressure is very close to zero. Here, as shown in FIG. 14, the moving average value from $2\alpha$ seconds to $\alpha$ seconds prior with the current time as a starting point is referred to as a first moving average value. The moving average value from the current time to $\alpha$ seconds prior with the current time as the starting point is referred to as a second moving average value. The difference between the first moving average value and the second moving average value is small.

Figure 15:
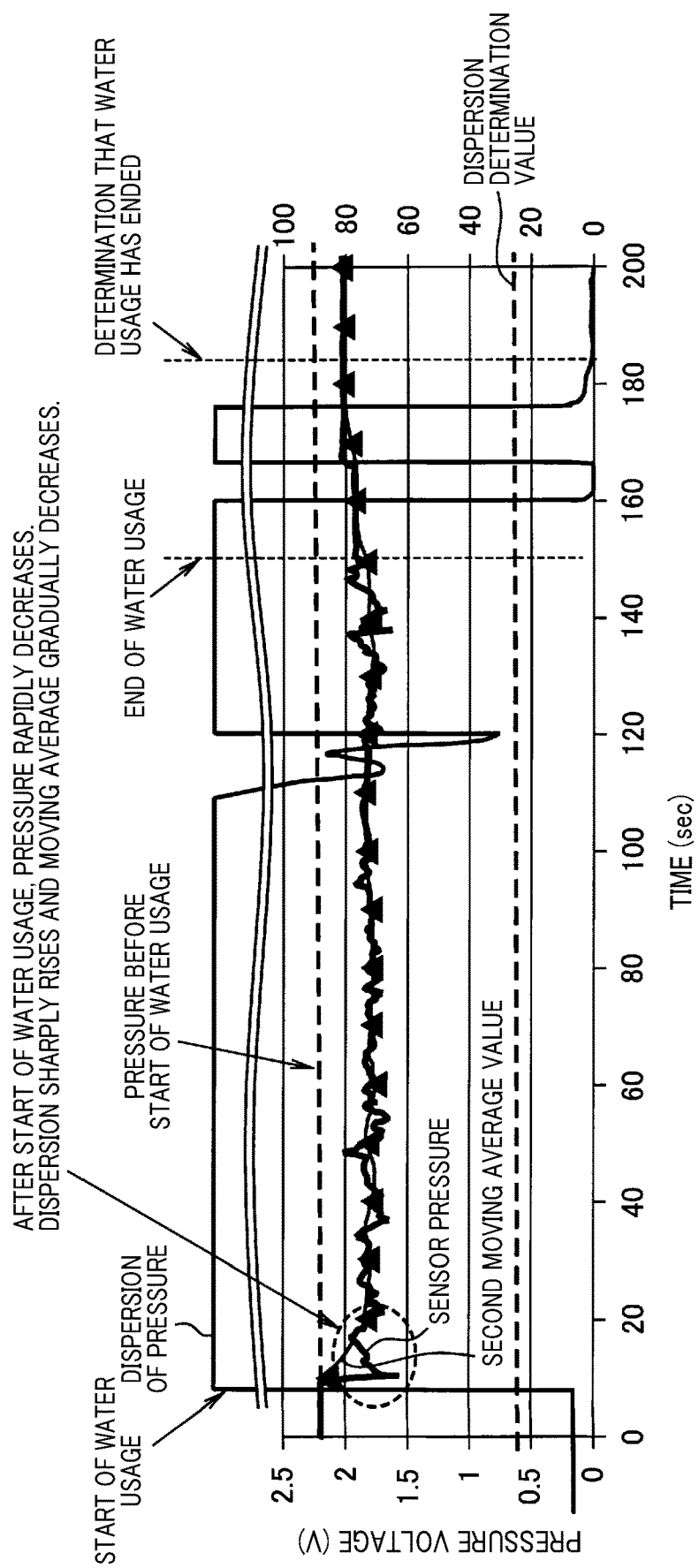
FIG. 15 is a diagram of changes in the second moving average value when water usage is started.

Then, when water usage is started, the pressure rapidly decreases. As a result of the pressure change, the moving average value gradually decreases with the elapse of time. Therefore, as shown in FIG. 15, the second moving average value decreases immediately after the start of water usage.

However, the first moving average value decreases after the elapse of a predetermined amount of time from the start of water usage. As a result, the difference between the second moving average value and the first moving average value indicates a value that is equal to or greater than a fixed value during a fixed amount of time. In addition, the dispersion of pressure changes immediately after the start of water usage.

From the foregoing, for a fixed amount of time with the change in dispersion as the starting point, 1) the dispersion exceeds the dispersion exceeds the threshold; and 2) the difference between the second moving average value and the first moving average value exceeds a fixed value.

When these two conditions 1) and 2) are met, a determination that water usage has started is made.

Figure 3:
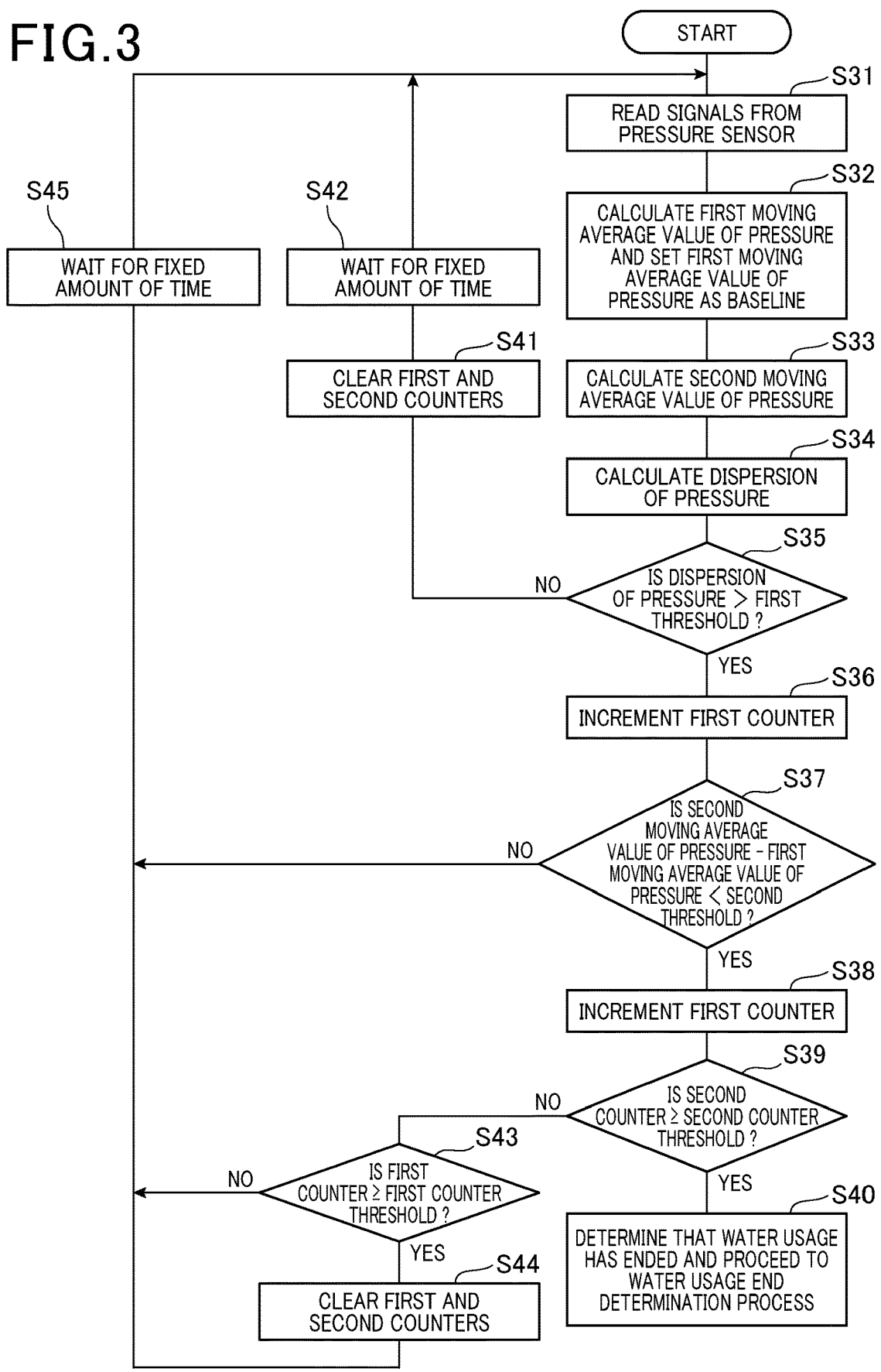
FIG. 3 is a flowchart of a water usage start determination process.

Next, the water usage start determination process will be described with reference to FIG. 3. First, the controller 5 reads the sensor signals of the pressure sensor 3 (step S31) and calculates the first moving average value (step S32). The first moving average value serves as a baseline, that is, the pressure before the start of water usage, described above. Next, the controller 5 calculates the second moving average value (step S33) and calculates the dispersion of pressure (step S34). Then, the controller 5 compares the determined dispersion to the first threshold (step S35). When determined that the dispersion is equal to or less than the first threshold (NO), the controller 5 determines that water is not in use, and clears first and second counters for water usage start determination (step S41). Then, the controller 5 waits for a fixed amount of time, such as 0.2 seconds, (step S42) and returns to step S31.

When determined that the dispersion exceeds the first threshold (YES at step S35), the controller 5 increments the first counter (step S36). Then, the controller 5 compares the difference between the second moving average value and the first moving average value to the negative second threshold (step S37). When determined that the difference is equal to or greater than the second threshold (NO), the controller 5 determines that water is not in use and waits for a fixed amount of time (step S45). Then, the controller 5 returns to step S31. When determined that the difference has become less than the second threshold (YES), the controller 5 increments the second counter (step S38). Then, the controller 5 compares the count value of the second counter to a second counter threshold (step S38). When determined that the count value is less than the second counter threshold (NO), the controller 5 compares the count value of the first counter to the first counter threshold (step S43). When determined that the count value is less than the first counter threshold (NO), the controller 5 proceeds to step S45.

At step S39, when the count value reaches the second counter threshold (YES), a state in which the conditions 1) and 2) are met for a fixed amount of time occurs. Therefore, the controller 5 determines that water usage has started and proceeds to the water usage end determination process (step S40). Meanwhile, at step S43, when determined that the count value has reached the first counter threshold (YES), the controller 5 clears the first and second counters in a manner similar to that at step S41 (step S44) and proceeds to step S45. This case is that in which, while the dispersion of pressure exceeds the first threshold, a state in which the difference between the two moving average values becomes equal to or greater than the second threshold occurs midway. This means that the conditions 1) and 2) are not continuously met. Therefore, the first and second counters are cleared.

As described above, according to the present embodiment, the controller 5 of the water leakage detection apparatus 20 samples the sensor signals outputted from the pressure sensor 3 at every fixed amount of time, in a state in which the water pipe 1 is closed by the electromagnetic valve 2. The controller 5 successively accumulates the differential values of the sensor signals and determines the sum of differential values. Then, upon elapse of the predetermined determination time, when the sum of differential values exceeds the determination value, the controller 5 performs the water leakage determination to detect water leakage. In cases in which a minute water leakage has occurred, the decrease in pressure indicated by the sensor signals gradually progresses. However, the value obtained through accumulation of the differential values of the sensor signals indicate a greater change than the immediate value of pressure indicated by the sensor signals. Therefore, compared to cases in which the pressure indicated by the sensor signals is evaluated based on the immediate value, a minute water leakage can be detected in a short amount of time. The water leakage detection apparatus 20 according to the present embodiment is capable of detecting a minute water leakage using the pressure sensor 3, without need for the water pipe 1 to have a special structure and without use of a precise flowrate sensor.

In addition, the controller 5 sets either of the determination time and the determination value, or both, based on the amount of water in the water pipe $1d$ on the downstream side of the position in which the electromagnetic valve 2 is disposed. As a result, either of the determination time and the determination value, or both, can be set based on the plumbing system in which the water leakage detection apparatus 20 is disposed. Determination can be accurately performed. In addition, the determination time can be optimized and water leakage determination can be efficiently performed.

Specifically, the controller 5 sets the determination time to be longer or the determination value to be lower, or both, as the amount of water in the water pipe $1d$ increases. The degree of decrease in pressure is proportional to the amount of water. For example, when the amount of water is large, the degree of decrease in pressure is small. Therefore, for example, when the determination value is fixed, the determination can be reliably performed by the determination time being set to be longer and the number of samples being increased. When the determination time is fixed, the determination value can be set to be lower and the determination timing for the same number of samples can be made earlier. As a result, for example, under a circumstance in which the amount of water in the water pipe $1d$ is relatively small and the amount of water usage is not fixed, the water leakage determination can be completed in a short amount of time. The amount of time over which water cannot be used can be minimized. In addition, under a condition in which the amount of water in the water pipe $1d$ is large but the period over which water is not used is determined, time can be taken for the water leakage determination and erroneous determination can be reduced.

In addition, when the water leakage detection device 20 is initially set up, the controller 5 can be set to the threshold determination mode. Either of the determination time and the determination value, or both, can be determined based on the decrease in pressure when a fixed amount of water is discharged in a state in which the electromagnetic valve 2 is closed. As a result, either of the determination time and the determination value, or both, can be determined based on the actual amount of water in the water pipe in which the water leakage apparatus 20 is set.

Furthermore, the controller 5 stores past water usage patterns. The controller 5 performs the water leakage determination in a time period during which water is highly likely to not be in use. As a result, the water leakage determination being performed during a time at which the user uses water can be prevented. Moreover, the controller 5 determines whether or not water is in use before performing the water leakage determination. When determined that water is in use, the controller 5 does not perform the water leakage determination. Rather, the controller 5 performs the water leakage determination after determining that water usage has ended. Therefore, the water leakage determination can be performed such as to avoid a time period during which the user is using water.

In addition, according to the present embodiment, when determined that water usage has started, the controller 5 samples the sensor signals from the pressure sensor 3 at every fixed amount of time. The controller 5 determines the moving average value of the sensor signals and the dispersion of the sensor signals. Then, when a state in which the difference between the moving average value and the pressure value immediately before the start of water usage falls within a certain range and the dispersion is less than the threshold continues for a fixed amount of time, the controller 5 determines that water usage has ended. As a result, the end of water usage can be reliably determined.

Furthermore, when determined that water usage has ended, the controller 5 compares the first moving average value and the second moving average value. The first moving average value is the moving average value determined during a period from 2α seconds to α seconds prior to the current time. The second moving average value is the moving average value determined during a period from α seconds prior to the current time to the current time. Then, when the dispersion exceeds the threshold and the difference between the two moving average values exceeds a threshold, the controller 5 determines that water usage has started. As a result, the start of water usage can be reliably determined.

The present disclosure is not limited to only the embodiment described above or shown in the drawings. Modifications and expansions such as those below are also possible.

The sampling interval of the sensor signals may be appropriately modified.

The number of samples used for determination may be appropriately modified.

What is claimed is:

1. A water leakage detection apparatus comprises:
   a pressure sensor that is disposed in a water pipe;
   a detecting unit that detects water leakage based on sensor signals from the pressure sensor; and
   an actuator that is controlled by the detecting unit, and opens and closes an electromagnetic valve that is disposed in the water pipe,
   wherein the detecting unit samples the sensor signals in a state in which the water pipe is closed by the electromagnetic valve, and performs a water leakage determination for detecting water leakage based on the sampled sensor signals, and
   the detecting unit sets a determination value based on a volume of water retained in plumbing downstream of the electromagnetic valve, determines a cumulative value by successively accumulating values of the sensor signals in a state in which the water pipe is closed by the electromagnetic valve, and performs the water leakage determination for detecting water leakage in response to the cumulative value exceeding the determination value.

2. The water leakage detection apparatus according to claim 1, wherein:
   the detecting unit stores past water usage patterns, and performs the water leakage determination during a time period in which water is highly likely to not be in use.

3. The water leakage detection apparatus according to claim 1, wherein:
   the detecting unit determines the cumulative value by successively accumulating differential values of the sensor signals, and performs the water leakage determination for detecting water leakage when the cumulative value exceeds the determination value upon elapse of a predetermined determination time.

4. The water leakage detection apparatus according to claim 3, wherein:
   the detecting unit determines either of the predetermined determination time and the determination value, or both, based on a decrease in pressure when a fixed volume of water is discharged in a state in which the electromagnetic valve is closed, when set to threshold determination mode during set-up.

5. The water leakage detection apparatus according to claim 3, wherein:
   the detecting unit sets the predetermined determination time and the determination value, based on the volume of water retained in plumbing on a downstream side of a position at which the electromagnetic valve is disposed.

6. The water leakage detection apparatus according to claim 3, wherein:
   the detecting unit sets either of the predetermined determination time to be longer and the determination value to be lower, or both, as the volume of water in the plumbing increases.

7. The water leakage detection apparatus according to claim 6, wherein:
   the detecting unit determines either of the predetermined determination time and the determination value, or both, based on a decrease in pressure when a fixed volume of water is discharged in a state in which the electromagnetic valve is closed, when set to threshold determination mode during set-up.

8. The water leakage detection apparatus according to claim 7, wherein:
   the detecting unit stores past water usage patterns, and performs the water leakage determination during a time period in which water is highly likely to not be in use.

9. The water leakage detection apparatus according to claim 8, wherein:
   the detecting unit determines whether or not water is in use before performing the water leakage determination, does not perform the water leakage determination when determined that water is in use, and performs the water leakage determination when determined that water usage has ended.

10. A water leakage detection method that comprises:
    controlling a detecting unit to detect sensor signals from a pressure sensor that is disposed in a water pipe;
    closing, by an actuator that is controlled by the detecting unit, an electromagnetic valve that is disposed in the water pipe;
    sampling, by the detecting unit, the sensor signals in a state in which the water pipe is closed by the electromagnetic valve;

setting, by the detecting unit, a determination value based on a volume of water retained plumbing downstream of the electromagnetic valve;

determining, by the detecting unit, a cumulative, value by successively accumulating values of the sensor signals in a state in which the water pipe is closed by the electromagnetic valve; and performing, by the detecting unit, a water leakage determination for detecting water leakage in response to the cumulative value exceeding the determination value.

* * * * *